Figure 1:
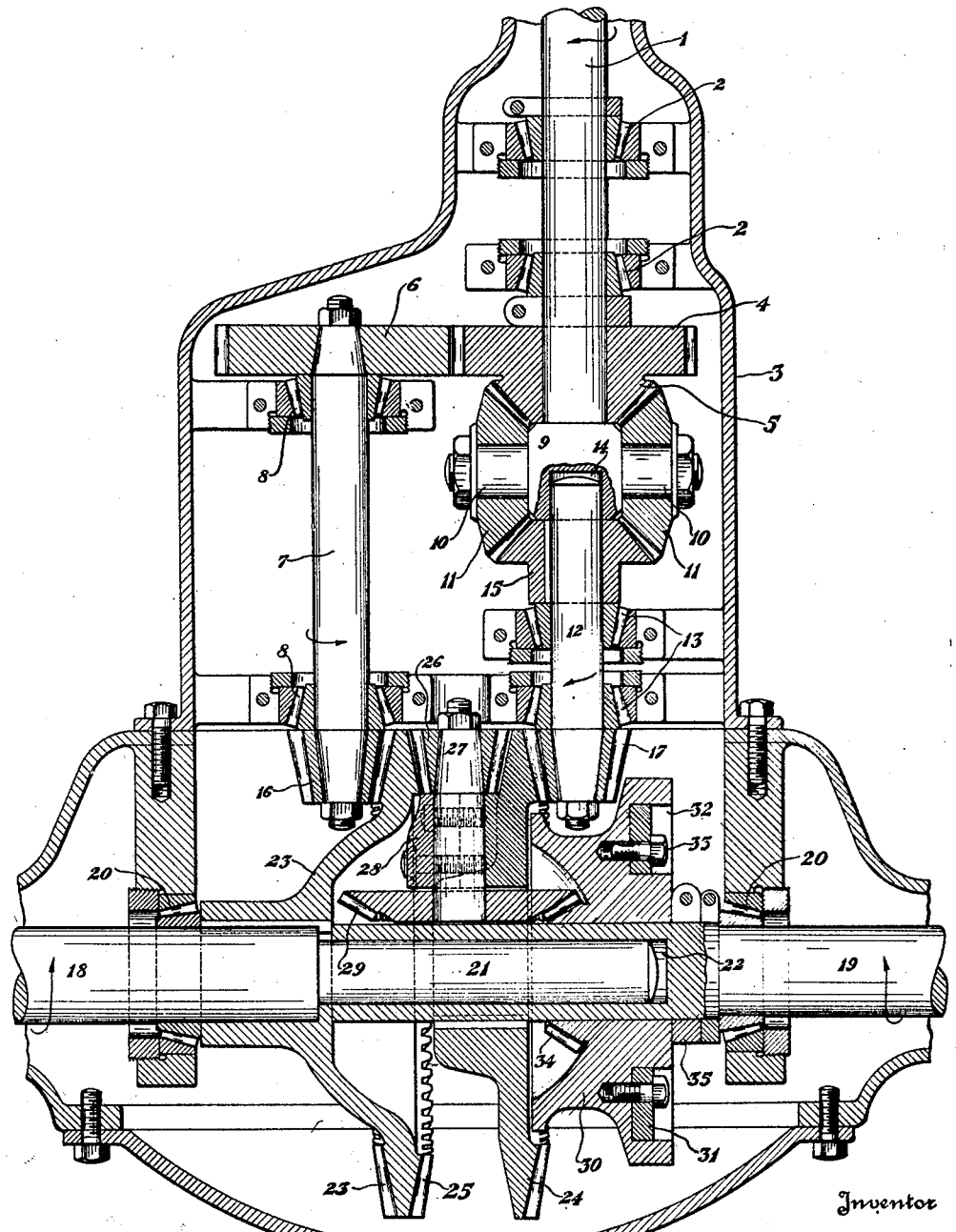

Jan. 4, 1927.

J. J. BALAUN 1,613,371

AXLE DRIVE

Filed March 15, 1926　　2 Sheets-Sheet 1

Inventor

John J. Balaun

By Freass and Boud

Attorneys

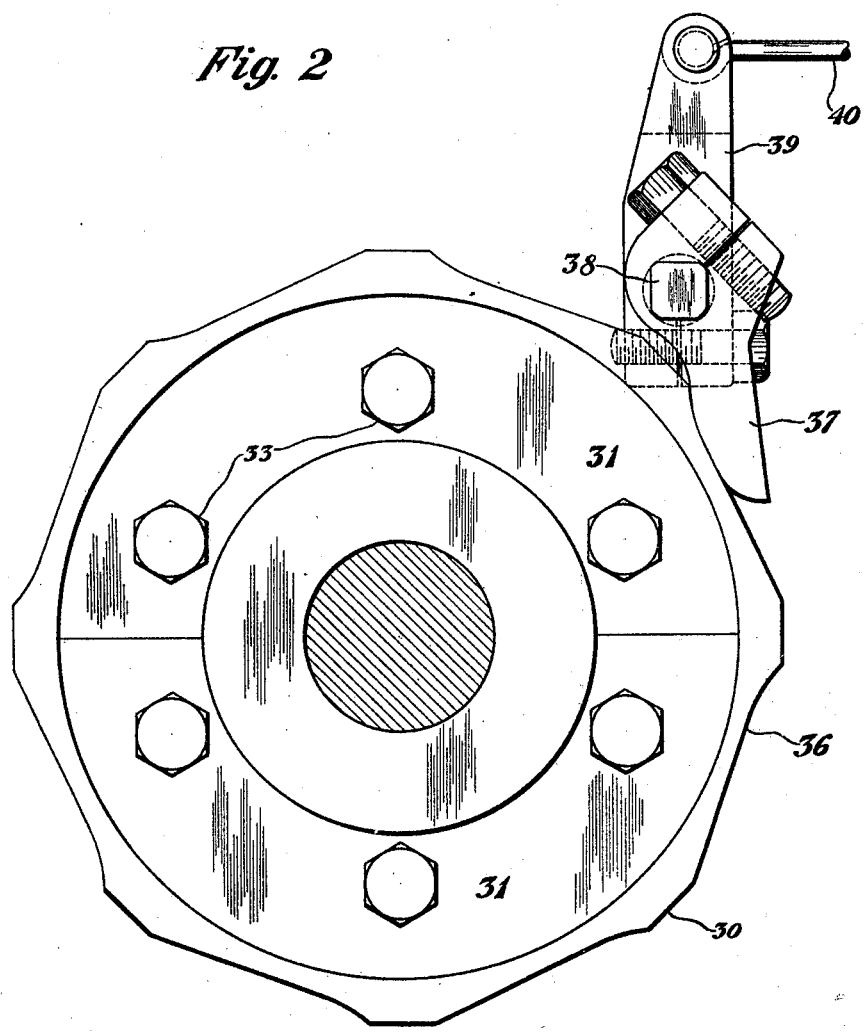

Patented Jan. 4, 1927.

1,613,371

UNITED STATES PATENT OFFICE.

JOHN J. BALAUN, OF CANTON, OHIO.

AXLE DRIVE.

Application filed March 15, 1926. Serial No. 94,752.

The invention relates to driving mechanism for the axles of motor driven vehicles and comprises a differential gearing provided with a high speed balance lock arranged to operate automatically to regulate either driven wheel and prevent slipping or skiding of the wheels.

The object of the invention is to provide a differential gearing between the jack shaft or main drive shaft of the motor and the driven wheels of the vehicle to drive the two driven wheels independently and equally; a high speed balance lock being provided for automatically locking, and being geared to, the axle drive gears in order to pull equally on the same.

The improved gearing provides for preventing one or the other of the drive wheels from slipping or skidding upon ice and provides for locking both driving gears in order to prevent slipping of one wheel in deep mud or the like, both wheels being locked together and the full power being transmitted to the other wheel; the automatic high speed balance lock preventing the skidding or slipping of the wheels when going at a high rate of speed and regulating the speed of either wheel when momentarily leaving the road as by encountering an obstacle upon the road.

An embodiment of the invention is illustrated in the accompanying drawings, in which—

Figure 1 is a plan sectional view of the improved gearing, and

Fig. 2, a side elevation of the balance lock and the foot pedal mechanism for regulating the same.

Similar numerals refer to similar parts throughout the drawings.

The jack shaft or main draft shaft from the engine is indicated at 1 and may be journaled in bearings such as the roller bearings 2 mounted in any suitable manner within the housing 3 which encloses all of the gearing to which the invention pertains.

A gear 4 is journaled upon the main drive shaft 1, a bevel pinion 5 being fixed thereon and preferably formed integral with the gear 4 as shown in Figure 1.

The gear 4 meshes with a similar gear 6 upon a countershaft 7, journaled in bearings, such as the roller bearings 8 which may be supported within the housing 3 in suitable manner.

A hub 9 is mounted upon the inner end of the main drive shaft 1 and provided with diametrically opposed stud shafts 10 upon which are journaled bevel pinions 11 meshing with the pinion 5. A shaft 12, alined with the main drive shaft 1, is journaled, as in the roller bearings 13 supported within the housing, parallel to the shaft 7, said shafts 7 and 12 being termed twin shafts.

The hub 9 is preferably provided with a bearing socket 14 which receives the adjacent end of the shaft 12, and a bevel pinion 15 is fixed upon the shaft 12 and meshes at diametrically opposite points with the bevel pinions 11. Bevel pinions 16 and 17 are fixed upon the inner ends of the twin shafts 7 and 12 respectively.

The drive axles 18 and 19, which carry the rear wheels of the vehicle, are journaled in bearings such as the roller bearings 20 supported within the housing, the axle 18 having the reduced inner end portion 21 rotatably mounted within the sleeve portion 22 of the axle 19. The axle gears, preferably in the form of bevel gears 23 and 24, are fixed upon the axles 18 and 19 respectively, and mesh with the pinions 16 and 17 respectively, the axle 18 being thus driven from the main drive shaft 1 through the gears 4 and 6, twin shaft 7, pinion 16 and axle gear 23; while the axle 19 is driven from the main drive shaft through the universal pinions 5, 11 and 15, bevel pinion 17 and axle gear 24.

The axle gear 23 is provided with a bevel gear face 25, meshing with a bevel pinion 26, which is fixed upon a radial shaft 27 journaled in a bearing bracket 28, carried by the gear 24, a bevel gear 29 being fixed upon the other end of the shaft 27.

The balance lock is in the form of a weighted balance wheel 30, loosely mounted upon the axle 19, weights 31 of desired heaviness being carried in the annular socket 32 thereof, as by the screws 33.

A bevel pinion 34 is formed upon the wheel 30, and meshes with the bevel gear 29, the collar 35 upon the axle 19 holding the balance lock wheel in position to retain said pinion and gear in mesh.

The periphery of the balance lock wheel 30 is provided with spaced, slightly concave surfaces 36 arranged to be engaged by the pawl 37, mounted upon the rocker shaft 38, which is operated through a rocker arm 39 and link 40, from a brake pedal.

Under ordinary conditions the two wheel axles 18 and 19 will be independently driven at the same speed by the gearing above described. In the event one wheel or the other gets upon ice or a slippery portion of the road it will not slip, the resistance on the balance lock acting through the gear 29 and pinion 26 overcoming the tendency for the wheel to slip.

This balance lock mechanism will also prevent skidding or slipping of the wheels when going at a high rate of speed and will automatically regulate the speed of either wheel which may momentarily leave the road when striking an obstacle upon the road at a fast rate of speed.

In the event one wheel or the other is in deep mud, or the like, the foot pedal may be operated to apply pressure from the pawl 37 upon the balance lock wheel positively driving the two axles through the axle gears and transmitting the full power to the other wheel.

I claim:

1. Axle drive gearing including a drive shaft, a pair of twin shafts, an operative connection between the drive shaft and twin shafts arranged to compensate for differential movement of the twin shafts, a pair of independently movable axles, a gear fixed upon each axle, a pinion upon each twin shaft meshing with the corresponding gear, a balance wheel journaled upon one of the axles, means for normally rotating the balance wheel with said axle, comprising a differential gear connection between the balance wheel and axles, and means for stopping rotation of the balance wheel to positively drive both axles.

2. Axle drive gearing including a drive shaft, a pair of twin shafts, an operative connection between the drive shaft and twin shafts arranged to compensate for differential movement of the twin shafts, a pair of independently movable axles, an operative connection between each twin shaft and the corresponding axle, a balance wheel journaled upon one of the axles and means for normally rotating the balance wheel with said axle comprising a differential gear connection between the balance wheel and axles for automatically regulating the speed of the axles.

3. Axle drive gearing including a drive shaft, a pair of twin shafts, an operative connection between the drive shaft and twin shafts arranged to compensate for differential movement of the twin shafts, a pair of independently movable axles, an operative connection between each twin shaft and the corresponding axle, a balance wheel journaled upon one of the axles forming a differential gear connection between the balance wheel and axles, means for normally rotating the balance wheel with said axle and means for stopping the rotation of the balance wheel to positively drive both axles.

4. Axle drive gearing including a drive shaft, a pair of twin shafts, an operative connection between the drive shaft and twin shafts arranged to compensate for differential movement of the twin shafts, a pair of independently movable axles, an operative connection between each twin shaft and the corresponding axle, a balance wheel journaled upon one of the axles, means for normally rotating the balance wheel with said axle and for increasing and decreasing the speed of the balance wheel with reference to said axle, said means comprising a differential gear connection between the balance wheel and axles for automatically regulating the speed of the axles.

5. Axle drive gearing including a drive shaft, a pair of twin shafts, an operative connection between the drive shaft and twin shafts arranged to compensate for differential movement of the twin shafts, a pair of independently movable axles, a gear fixed upon each axle, a pinion upon each twin shaft meshing with the corresponding gear, a balance wheel journaled upon one of the axles and means for normally rotating the balance wheel with said axle, said means comprising a differential gear connection between the balance wheel and axles for automatically regulating the speed of the axles.

6. Axle drive gearing including a drive shaft, a pair of twin shafts, an operative connection between the drive shaft and twin shafts arranged to compensate for differential movement of the twin shafts, a pair of independently movable axles, a gear fixed upon each axle, a pinion upon each twin shaft meshing with the corresponding gear, a balance wheel journaled upon one of the axles and means carried by one of the gears for normally rotating the balance wheel with said axle, said means comprising a differential gear connection between the balance wheel and axles for automatically regulating the speed of the axles.

7. Axle drive gearing including a drive shaft, a pair of twin shafts, an operative connection between the drive shaft and twin shafts arranged to compensate for differential movement of the twin shafts, a pair of independently movable axles, a gear fixed upon each axle, a pinion upon each twin shaft meshing with one of said gears, a balance wheel journaled upon one of the axles, a radial shaft journaled upon one of the gears, a pinion upon the radial shaft meshing with the other gear and an operative connection between said radial shaft and the balance wheel.

8. Axle drive gearing including a drive shaft, a pair of twin shafts, an operative connection between the drive shaft and twin shafts arranged to compensate for differential movement of the twin shafts, a pair of independently movable axles, a gear fixed upon each axle, a pinion upon each twin shaft meshing with the corresponding gear, a balance wheel journaled upon one of the axles, a radial shaft journaled upon one of the gears, a pinion upon the radial shaft meshing with the other gear, an operative connection between said radial shaft and the balance wheel and means for stopping the rotation of the balance wheel and permitting rotation of the axle upon which it is journaled.

In testimony that I claim the above, I have hereunto subscribed my name.

JOHN J. BALAUN.